United States Patent
Cheung et al.

(10) Patent No.: US 7,664,122 B1
(45) Date of Patent: Feb. 16, 2010

(54) CALL TRACKING USING VOICE QUALITY MEASUREMENT PROBE

(75) Inventors: Eric Cheung, New York, NY (US); Mark Foladare, Middletown, NJ (US); Shelley Goldman, Middletown, NJ (US); Kermit H. Purdy, Somerset County, NJ (US); David H. Shur, Holmdel, NJ (US)

(73) Assignee: AT&T Corp., New York, NY (US)

( * ) Notice: Subject to any disclaimer, the term of this patent is extended or adjusted under 35 U.S.C. 154(b) by 710 days.

(21) Appl. No.: 10/747,193

(22) Filed: Dec. 30, 2003

Related U.S. Application Data

(60) Provisional application No. 60/484,305, filed on Jul. 3, 2003.

(51) Int. Cl.
*H04L 12/28* (2006.01)
*H04L 12/56* (2006.01)
*H04L 12/66* (2006.01)

(52) U.S. Cl. ............... 370/401; 370/352; 379/1.04

(58) Field of Classification Search ........... 370/352, 370/252, 356–358, 401, 392; 379/1.03, 1.04, 379/32.01, 1.01
See application file for complete search history.

(56) References Cited

U.S. PATENT DOCUMENTS

| | | | |
|---|---|---|---|
| 6,157,648 A * | 12/2000 | Voit et al. ............... | 370/401 |
| 6,298,042 B1 | 10/2001 | Murase et al. | |
| 6,334,118 B1 | 12/2001 | Benson | |
| 6,498,783 B1 | 12/2002 | Lin | |
| 6,539,205 B1 | 3/2003 | Wan et al. | |
| 6,556,659 B1 | 4/2003 | Bowman-Amuah | |
| 6,563,796 B1 | 5/2003 | Saito | |
| 6,574,216 B1 * | 6/2003 | Farris et al. ................ | 370/352 |
| 6,940,849 B2 * | 9/2005 | Eichen et al. ............... | 370/352 |
| 6,980,517 B1 * | 12/2005 | Qureshi et al. ............. | 370/235 |
| 7,123,608 B1 * | 10/2006 | Scott et al. .................. | 370/353 |
| 7,209,473 B1 * | 4/2007 | Mohaban et al. ........... | 370/352 |
| 7,295,549 B2 * | 11/2007 | Pepin et al. ................. | 370/352 |
| 2002/0118813 A1 * | 8/2002 | Brehm et al. ............... | 379/229 |
| 2003/0086425 A1 * | 5/2003 | Bearden et al. ............ | 370/392 |
| 2003/0145076 A1 * | 7/2003 | Procopio et al. ........... | 709/224 |
| 2003/0202506 A1 * | 10/2003 | Perkins et al. .............. | 370/352 |
| 2004/0073655 A1 * | 4/2004 | Kan et al. ................... | 709/224 |
| 2006/0153174 A1 * | 7/2006 | Stauber et al. ............. | 370/356 |

OTHER PUBLICATIONS

Tom Gallatin, Finding and Fixing VoIP Problems, May 2003, Internet Telephony Feature Article, pp. 1-6, May 2003.*

* cited by examiner

*Primary Examiner*—Binh K Tieu

(57) ABSTRACT

A system for monitoring quality of calls in a network. A server receives information concerning calls which begin or end in a network and at the same time receives measurements of a quality parameter such as bandwidth. This measurement data is provided by a probe, so that the server is able to correlate calls which are placed through the network with the quality of service in the network at that time. When the quality falls below a desired level, the server notifies the customer or the network operator so that appropriate action may be taken.

15 Claims, 1 Drawing Sheet

CALL TRACKING USING VOICE QUALITY MEASUREMENT PROBE

This Nonprovisional application claims priority under 35 U.S.C. § 119(e) on U.S. Provisional Application Nos. 60/484,305 filed on Jul. 3, 2003, the entire contents of which are hereby incorporated by reference.

BACKGROUND OF THE INVENTION

1. Field of the Invention

The present invention relates generally to a system for tracking calls through telecommunication networks and more particularly to a system for tracking calls to determine voice quality no matter which network the call is placed in, and informing the customer when service is below quality standards.

2. Description of the Background Art

Customer service is an important concept in any industry and especially in a complicated and competitive industry such as telecommunications. Telephone callers and users of other communication systems are very cognizant of the quality of the transmission and insist that their calls be clear and static free. Likewise, users of data systems, such as the Internet, also desire their transmissions to be timely and without fluctuations.

The situation has become more complex in the United States since telephone systems no longer are controlled by a single company. Thus, it is possible that a caller will be a customer of one company, the called person will be a customer of another company, and additional companies may be involved in transmitting the call between the two end points. To complicate matters further, if a data transmission is involved, various functions of the programs may be products of still further companies which are not involved with the actual transmission but which have produced the programs being used or perhaps the hardware being used.

Because of these complex systems, it is difficult for the customer or even the companies to know where problems exist when communications are not at the level of quality desired by the user. Since the user may appropriately refuse to pay for services which are not at the quality promised, revenues may be lost which are damaging to the companies involved. Perhaps more importantly, the goodwill of the customer and the reputation of the company may be even further damaged. Since more than one company is involved, it is possible that the customer will blame the wrong party and damage the business reputation of an innocent company.

In order for companies to provide the best service to the customers, to locate problem areas in their networks and to protect their reputations, systems have been developed to monitor the quality of calls. If problems are noted in time, the network can be modified to avoid problems by routing calls in a different direction in the network. Also, by noting the occurrence of low-quality service, companies can be more receptive to customer complaints.

While these systems are helpful, especially where communications occur within a single network, it has been difficult to provide for the tracking of calls where multiple networks are involved. Also, it is especially difficult to obtain any information where an application program is being utilized which has been sold by a particular company but where the calls are being routed through other companies only. Since customers who buy the applications program may blame the software for various problems rather than the carriers, it is important for the application software provider to be able to obtain information about the quality of communication service when their product is utilized.

SUMMARY OF THE INVENTION

Accordingly, the present invention provides a method for tracking quality of calls.

The present invention also provide a quality measurement probe used in call tracking.

The present invention further provides mapping of bandwidth performance to determine problems with the calls.

The present invention still further provides a system for determining quality of service in communications.

The present invention still further provides a method for mapping the capabilities of systems to carry customer calls.

Briefing, the invention achieves this by providing monitoring of the quality of the calls using the call packets regardless of the system in which the call is placed and determining problems areas based on the monitoring. This is correlated with a server which keeps track of the packet location to determine where problems lie. The customer or the network operators are then notified.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
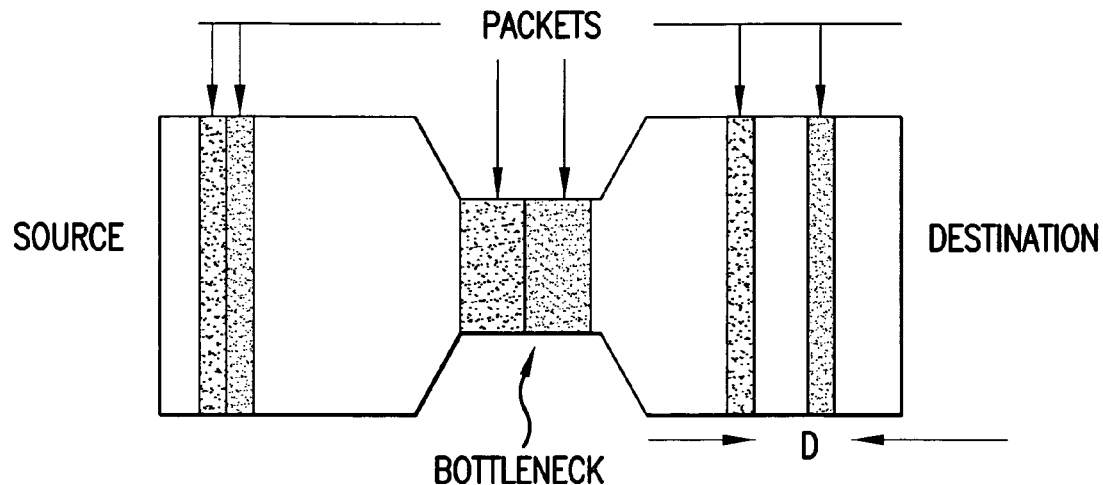
FIG. 1 is a diagram showing movement of data packets through a bottleneck.

A number of different systems have been developed in order to measure the quality of a communication once it is within a network. One quality measure involves timestamping a packet as it reaches different parts of the network so that operators can determine the delay of the packet as it moves within the system. Another quality measure involves determining the packet spacing at various points at the network. As seen in FIG. 1, as various packets progress through the network from the source to the destination end, the packets become spaced apart where bottlenecks occur. Thus, in FIG. 1, two adjoining packets are shown which individually take more time to go through the bottleneck portion then at the source. They are then consequently spaced further apart, even in the faster portions closer to the destination, than they would be otherwise. By measuring the particular spacing involved, it is possible to estimate the bandwidth available in that part of the network path.

By keeping track of the various packets that are inserted and received at different end points of the system, the various quality measurements of the relevant portions of the network can be estimated.

However, a problem exists where the network being traversed is not completely under the control of the company making the measurements. In particular, there arises a problem that an application program may be used by a customer which traverses more than one network owned by different companies. One of these companies might be the company which sells the application program but it is even possible that none of the networks traversed are controlled by the company which sells the application. Thus, in order to locate the various problems that may exist throughout the various networks, the application itself provides a measurement probe for the packets, the results of which may then be accumulated.

As part of the programming of the application, packets generated by the application are used to measure the bandwidth at various points in time as they traverse various networks. This information is then provided to a server which keeps track of the quality of performance of the path between two end points. The server is able to coordinate the measured quality information of each path with the information regarding which calls are being placed. The result of this is that for any particular call, quality factors are determined both in regard to time and location in various networks.

Operators of the quality system are able to review this information and determine where quality is lacking for individual calls. This allows remedial steps to be taken to enhance the service to the customer. First, if the problem is in networks controlled by this company, corrective action can be taken to improve the situation to prevent any further loss of service. If the problem occurs in networks controlled by other companies, it is possible to inform them of the situation so they can improve their system. It is also possible to notify the customer so that they are aware that a problem exists and to inform them where the fault lies. If the fault lies with another company, it protects the reputation of the measuring company and their application program. Even if the problem is with facilities operated by the measuring company, the fact that the company has informed the customer of the loss of quality and has reduced its charges because of it, even before the customer has complained, may actually enhance the reputation of the company. Thus, this quality measurement system allows the measuring company to better serve the customer whether the problem is in their own equipment or equipment operated by others.

Figure 2:
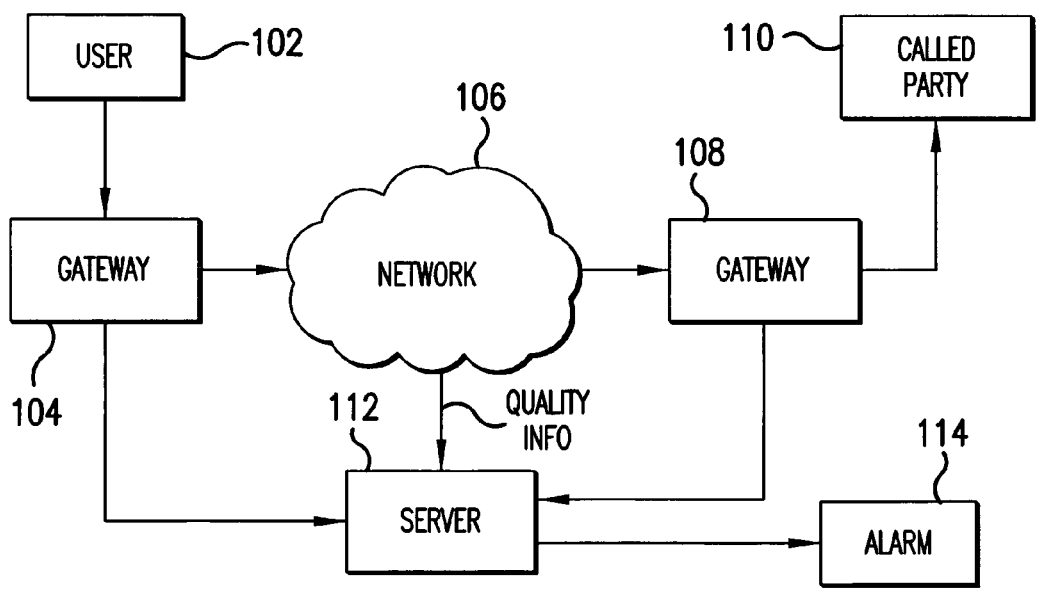
FIG. 2 is a block diagram showing a system according to the present invention.

FIG. 2 is a block diagram showing the overall arrangement of the apparatus used in this system. A user 102 is connected through standard phone lines or other electronic pathways to the gateway 104. This can be a communications provider, an Internet provider or the like. This gateway is connected to some communication system 106, such as the standard telephone network, the Internet or other such systems. The user's call is routed through this network to a gateway 108 at the other end which connects the user to a called party 110. The network 106 may actually be a series of networks which interconnect the two gateways and may involve a number of different companies to carry the call. A server 112 is connected to the gateways and also to the network. Information is sent to the server when the call is placed through gateway 104 and when it is received at gateway 108. In addition to this, the server is connected to the network so that it receives information regarding the measurement of the bandwidth or other parameter regarding call quality. The server correlates the information about the location of the call with the quality of signals in order to determine problems with specific calls. When problems are noted, alarm system 114 is actuated. While this could be an actual audible or visual signal, more appropriately it is an electronic alert, or even contained in a printout or other message to the system operator that a problem has occurred. This may also be connected to a system for noting the problem when a bill is prepared so that the user is not charged for bad quality service. It may also be utilized to send messages to systems which are not operated by the measuring company to let them know that their system is defective. Similar messages could be sent to the user so that he is aware that he does not need to make a complaint about the quality.

It can be seen that two different concepts are being merged in this system. One is the general concept of making quality measurements which has been known. However, this is being combined with the concept of tracking the path that the calls take so that the quality of the call at various locations can be determined and appropriate measures can be instituted in response thereto. This is accomplished by combining the information from the server which tracks the calls with a server which monitors quality.

The system may be used in real time so that a faster response may be made to serve the customer better. It is also scalable to different sized systems. The system may be utilized for traditional calling or for various digital data systems. The networks may be a traditional telephone network, the Internet, cable systems or DSL systems or any other electronic communication system. The measurement of the quality of the communication may be any of the standard measurement parameters. In addition to bandwidth, the parameters may be delay, loss, jitter, and R factor.

Numerous additional modifications and variations of the present invention are possible in light of the above teachings. It is therefore to be understood that within the scope of the appended claims, the invention may be practiced otherwise unless specifically described herein.

The invention claimed is:

1. A method of tracking call quality of a call traveling through a network, comprising:
   recording an entry and a termination of the call through at least one gateway in the network;
   detecting a measurement of call quality of the call within the network; and
   correlating said entry and said termination of the call with the measurement of call quality of the call to determine a location within the network where the call falls below a standard call quality, wherein the network comprises a plurality of sub networks that is operated by at least two different companies.

2. The method according to claim 1, wherein a respective company of the at least two different companies operating the location within the network where the call falls below the standard call quality is informed.

3. The method according to claim 1, wherein a user is informed if the call falls below the standard call quality.

4. The method according to claim 1, wherein an operator of a measurement system is informed if the call falls below the standard call quality.

5. The method according to claim 1, wherein the measurement of call quality comprises a measurement of bandwidth.

6. The method according to claim 1, wherein the measurement of call quality comprises a measurement of delay.

7. The method according to claim 1, wherein the measurement of call quality comprises a measurement of packet loss.

8. The method according to claim 1, wherein the measurement of call quality comprises a measurement of jitter.

9. The method according to claim 1, wherein the measurement of call quality comprises a measurement of R factor.

10. A system for tracking call quality in a network, comprising:
    a calling apparatus connected to a first gateway of said network;
    a called apparatus connected to a second gateway of said network, whereby a call is placed between said calling apparatus and said called apparatus through said network;

a quality parameter measuring apparatus for determining a call quality call;

a recording apparatus for recording a beginning and a termination of said call in said gateways; and a server for receiving information from said recording apparatus and said quality parameter measuring apparatus and for correlating said information to determine a location within the network where the call has a low-level call quality, wherein the network comprises a plurality of sub networks that is operated by at least two different companies.

11. The system according to claim 10, further comprising an alarm system for identifying the low level call quality and informing one or more parties.

12. The system according to claim 11, wherein the one or more parties comprises a respective company of said at least two different companies operating the network where the call has said low-level call quality.

13. The system according to claim 11, wherein the one or more parties comprises a call initiator.

14. The system according to claim 11, wherein the one or more parties comprises an operator of the server.

15. The system according to claim 10, wherein the call quality comprises a measurement of bandwidth.

* * * * *